(12) United States Patent
Tiger et al.

(10) Patent No.: US 9,348,790 B2
(45) Date of Patent: May 24, 2016

(54) METHOD FOR EFFICIENT USE OF CONTENT STORED IN A CACHE MEMORY OF A MOBILE DEVICE

(71) Applicant: Onavo Mobile Ltd., Ramat Gan (IL)

(72) Inventors: Roi Tiger, Tel Aviv (IL); Guy Rosen, Palo Alto, CA (US); Eran Fridman, Zofit (IL); Gadi Eliashiv, Tel Aviv (IL); Ori Peleg, Mevaserat Zion (IL); Oren Held, Petah Tikva (IL)

(73) Assignee: FACEBOOK, INC., Menlo Park, CA (US)

( * ) Notice: Subject to any disclaimer, the term of this patent is extended or adjusted under 35 U.S.C. 154(b) by 446 days.

(21) Appl. No.: 13/864,902

(22) Filed: Apr. 17, 2013

(65) Prior Publication Data

US 2013/0232216 A1   Sep. 5, 2013

Related U.S. Application Data

(63) Continuation-in-part of application No. 13/351,727, filed on Jan. 17, 2012, which is a continuation-in-part of application No. 13/173,619, filed on Jun. 30, 2011.

(60) Provisional application No. 61/664,425, filed on Jun. 26, 2012, provisional application No. 61/559,181, filed on Nov. 14, 2011, provisional application No. 61/470,549, filed on Apr. 1, 2011.

(51) Int. Cl.
| | | |
|---|---|---|
| *G06F 15/16* | (2006.01) | |
| *G06F 15/167* | (2006.01) | |
| *H04W 4/00* | (2009.01) | |
| *H04L 12/813* | (2013.01) | |
| *H04L 29/08* | (2006.01) | |
| *H04W 52/02* | (2009.01) | |
| *H04W 4/20* | (2009.01) | |
| *H04L 12/801* | (2013.01) | |

(52) U.S. Cl.
CPC .............. *G06F 15/167* (2013.01); *H04L 47/20* (2013.01); *H04L 67/289* (2013.01); *H04L 67/2833* (2013.01); *H04W 4/003* (2013.01); *H04W 4/20* (2013.01); *H04W 52/0209* (2013.01); *H04L 47/14* (2013.01)

(58) Field of Classification Search
CPC .... H04L 67/104; H04L 63/126; H04L 9/3236
USPC ........................................................ 709/206
See application file for complete search history.

(56) References Cited

U.S. PATENT DOCUMENTS

| | | |
|---|---|---|
| 6,697,839 B2 | 2/2004 | Sini et al. |
| 7,155,519 B2 | 12/2006 | Lo et al. |
| 7,185,063 B1 * | 2/2007 | Kasriel ............... H04L 67/2814 709/216 |

(Continued)

*Primary Examiner* — Douglas Blair
*Assistant Examiner* — Imran Moorad
(74) *Attorney, Agent, or Firm* — Kacvinsky Daisak Bluni, PLLC

(57) ABSTRACT

A method for cache management of a mobile device communicatively connected to a network component via a network is provided. The method comprises receiving by the network component a request from the mobile device for a data item, the request accompanied by a unique identifier associated thereto, the data item residing in the cache; fetching the data item from at least a server communicatively connected to the network component; generating a unique identifier respective of the fetched data item; and comparing the generated unique identifier and the received unique identifier to determine whether the data item in the cache is the same as the data item fetched from the at least a server.

18 Claims, 4 Drawing Sheets

(56) References Cited

U.S. PATENT DOCUMENTS

| | | | |
|---|---|---|---|
| 7,277,915 B2 | 10/2007 | De Boor et al. | |
| 7,376,740 B1 | 5/2008 | Porter et al. | |
| 7,752,292 B1 | 7/2010 | Katzer | |
| 7,899,847 B2 | 3/2011 | Lau et al. | |
| 7,908,383 B2 | 3/2011 | Porter et al. | |
| 7,966,387 B1 | 6/2011 | Katzer | |
| 8,006,224 B2 | 8/2011 | Bateman et al. | |
| 8,006,283 B2 | 8/2011 | Reiher | |
| 8,099,113 B2 | 1/2012 | Morrison | |
| 8,510,472 B1* | 8/2013 | Anderson | G06Q 10/107 709/206 |
| 2002/0038429 A1* | 3/2002 | Smeets | 713/193 |
| 2006/0200738 A1 | 9/2006 | Tarle et al. | |
| 2006/0258341 A1 | 11/2006 | Miller et al. | |
| 2007/0174490 A1 | 7/2007 | Choi et al. | |
| 2007/0259676 A1 | 11/2007 | Golla | |
| 2009/0106110 A1* | 4/2009 | Stannard et al. | 705/14 |
| 2009/0248670 A1 | 10/2009 | Fiatal | |
| 2010/0037130 A1 | 2/2010 | Jakubowski | |
| 2010/0153434 A1 | 6/2010 | Erickson et al. | |
| 2010/0169787 A1 | 7/2010 | Boskovic | |
| 2010/0228737 A1* | 9/2010 | Riemers | 707/747 |
| 2010/0251143 A1 | 9/2010 | Thomas et al. | |
| 2011/0099612 A1 | 4/2011 | Lee et al. | |
| 2011/0231517 A1 | 9/2011 | Srinivasan et al. | |
| 2015/0339466 A1* | 11/2015 | Gao | G06F 21/36 726/16 |

* cited by examiner

METHOD FOR EFFICIENT USE OF CONTENT STORED IN A CACHE MEMORY OF A MOBILE DEVICE

CROSS REFERENCE TO RELATED APPLICATIONS

This application claims the benefit of U.S. Provisional Application No. 61/664,425 filed Jun. 26, 2012. This application is also a continuation-in-part of U.S. patent application Ser. No. 13/351,727 filed on Jan. 17, 2012. The 13/351,727 application claims the benefit of U.S. provisional application No. 61/559,181 filed on Nov. 14, 2011, and is a continuation-in-part of U.S. patent application Ser. No. 13/173,619 filed on Jun. 30, 2011 that claims the benefit of U.S. provisional application No. 61/470,549 filed on Apr. 1, 2011. The contents of the above cited applications are herein incorporated by reference.

TECHNICAL FIELD

The invention generally relates to data transfers of applications executed on a mobile device, and more specifically to efficient utilization of content on the mobile device's cache memory.

BACKGROUND

The use of mobile devices in general, and smart phones in particular, has significantly increased. In many cases mobile devices have become a primary replacement for other computing devices. Today mobile devices access a variety of applications and consume large amounts of data in both directions, i.e., the upload and download of data. Mobile devices typically utilize wireless bandwidth through a wireless local area network (WLAN) or the cellular network. The data bandwidth consumption by a mobile device through the cellular network, either in transfer speed or volume, tends to be expensive, especially when the user is outside of the boundaries of a given data package. Such costs may be further increased when the mobile device is capable of multi-tasking, i.e., the execution of multiple applications in parallel. To this end, the multiple applications make asynchronous demands for the data bandwidth over the costly data communication channel. This may be further costly in terms of power consumption of the mobile device, such that any increased efficiency of batteries is offset by the additional power required for the wireless communication either through a cellular network or a wireless local area network (WLAN).

Various techniques have been used to reduce the data bandwidth consumption by mobile devices. Standard ways to reduce the amounts of data sent to and from the mobile device include a plurality of well-known compression techniques. However, such techniques are limited and further data reduction may be required. This is particularly true with respect to data provided by e-mail applications where it has become customary to attach documents, pictures, video clips and the like which significantly increase the size of the e-mail. In many cases the user does not desire to receive all this data.

A common technique to reduce the amount of data is to not send an e-mail that is over a particular size to the mobile device, but to instead send only certain portions thereof and allow the user to request the download of the rest of the e-mail on demand. The threshold is typically a built-in function on the mobile application and operates automatically, providing certain additional bandwidth savings.

An exemplary protocol that is now widely used for the purpose of such synchronization of a mobile device is the Microsoft ActiveSync® protocol. However, this protocol does not define the kinds of compression or handling of data to reduce the amount of data provided to the mobile device. This decision is typically built-in by the application in general, and the e-mail application in particular. In a typical application, such as the e-mail application on Apple's iPhone®, two separate types of decisions are made by the e-mail application. One has to do with the size of the text in rich or simple format and the other has to do with handling attachments to an e-mail message. The decision is made on a per e-mail basis; therefore it is often the case that unwanted data is automatically downloaded to the mobile device, thereby increasing the user's cost unnecessarily.

However, there are many other applications that use the data communication channel for both upload and download of data. Such applications may be loaded onto the mobile device in open operating systems, such as, for example, an Android™ operating system. Such systems allow for any compatible application to be loaded onto the mobile device. The loaded applications, e.g., office applications, communication applications, game applications, and the like, may generate requests for upload or download of data through the data communication channel, which may result in significant costs to the user of the mobile device. Currently such applications cannot be configured as to when they can access data communication channels. Thus, the user has limited control over the amount of bandwidth that can be consumed by such applications.

Furthermore, as mobile devices have cache in which content is stored, such content is referenced by different applications installed on the mobile device. However, it is not always guaranteed that such data contained in the local cache is current and that it may be used by the same or another application as valid data. Consequently, repeated attempts to bring already existing data on the local cache occur frequently, thereby using both valuable bandwidth as well as reducing battery life.

It would be therefore advantageous to provide a solution that overcomes the limitations of currently available applications for mobile devices. It would be further advantageous if such a solution would not require changes to the applications that are downloaded to the mobile device.

SUMMARY

Certain embodiments disclosed herein include a computerized method for cache management of a mobile device communicatively connected to the network component via a network. The method comprises receiving by the network component a request from the mobile device for a data item, the request accompanied by a unique identifier associated thereto, the data item residing in the cache; fetching the data item from at least a server communicatively connected to the network component; generating a unique identifier respective of the fetched data item; and comparing the generated unique identifier and the received unique identifier to determine whether the data item in the cache is the same as the data item fetched from the at least a server.

Certain embodiments disclosed herein also include a network component for cache management of a mobile device communicatively coupled to the network component via a network. The network component comprises an interface to a data communication network, the interface configured for receiving a request for a data item from at least one application executed on the mobile device, the data item with a unique identifier associated thereto, and fetching the data item from at least a server communicatively coupled to the network component; and a processing unit that generates a unique identifier respective of the fetched data item and that compares the generated unique identifier and the received unique identifier to determine whether the data item in the cache is the same as the data item fetched from the at least a server.

Certain embodiments disclosed herein also include a mobile device that comprises a processing unit; a data communication interface to enable communication with at least a network component; a local cache; and a memory containing a plurality of instructions associated with an application for accessing a data item via the network component and storing the received data item in the local cache, the processing unit is configured to send a unique identifier associated with the data item stored in the local cache to the network component upon a subsequent request of the application to access the data item, and to receive an indication from the network component of whether the data item in the local cache is the same as a data item in at least a server communicatively coupled to the mobile device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
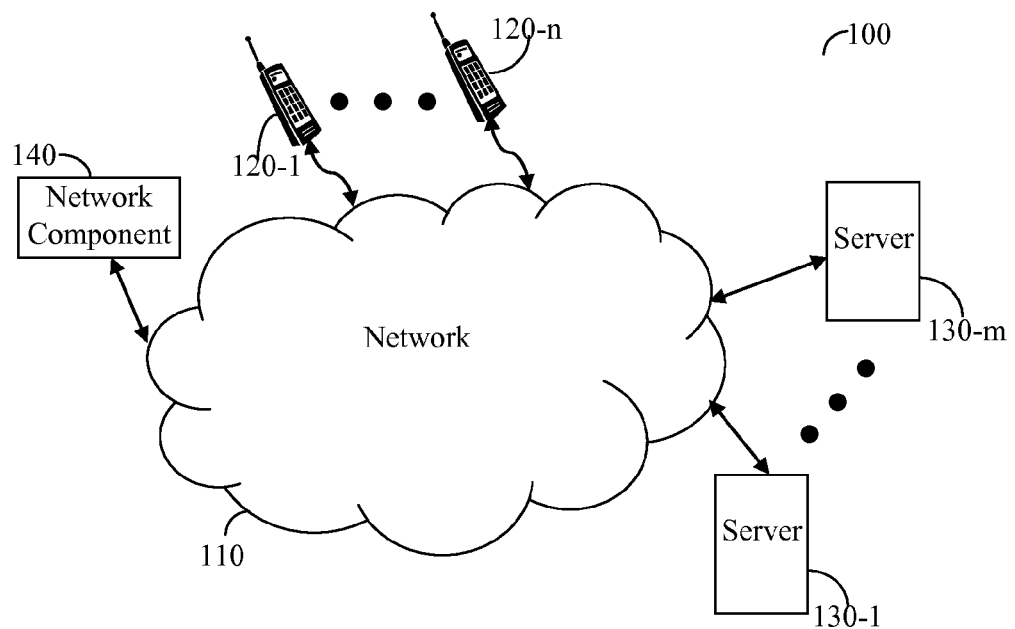
FIG. 1 is a system for communication between a plurality of mobile devices and a plurality of data sources.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

According certain embodiments disclosed herein a cache memory management of a mobile device is described. A network component receives a request for data with a hash number from a mobile device. The network component fetches the data and generates a hash number respective of the fetched data. The generated hash number is then compared to the received hash number and if the hash number is not equal the stale data is replaced with an updated data. If the generated hash number is equal to the received hash number then a signal is sent to the mobile device that the data exists in the local cache.

The disclosed embodiment can be carried out in a system that provides data communication management, for example, data bandwidth usage management, in wireless communication. The data communication management is controlled by using a local gateway agent (LGA) installed on a mobile device capable of multi-tasking. The LGA captures attempts to access the data network by any application of the mobile device. The LGA determines, without inquiring of the application, if that application may or may not access the data network directly. The LGA further determines if management or handling of data communication of any sort is necessary. The determination is being performed based on a policy of the LGA, which is executed prior to performing such data communication. The LGA may aggregate access attempts to the data network to reduce load and/or power consumption by the mobile device, either internally or in communication with an external proxy coupled to the data network.

FIG. 1 depicts an exemplary and non-limiting system 100 operative in accordance with an embodiment. A network 110 enables communication between one or more mobile devices 120-1 through 120-N. The network 110 may be wireless, cellular or wired, a local area network (LAN), a wide area network (WAN), a metro area network (MAN), the Internet, the worldwide web (WWW), like networks, and any combination thereof.

The network 110 also enables data communication for each application installed on a mobile device 120-1 through 120-N. Thus, an application installed on a mobile device can utilize upload and download bandwidth from the network 110. In a preferred embodiment, data communication of the mobile devices 120-1 to 120-N, and applications installed therein, is facilitated through a cellular network (which may be in part network 110). The cellular network may be, for example, a CDMA, GSM, 3G, and LTE cellular network.

The mobile devices 120-1 through 120-N may include, but are not limited to, smart phones, tablet computers, netbook computers, and laptop computers, that are designed to run in a multi-tasking mode. That is, a plurality of applications (also known as APPs) may be executed seemingly in parallel, in accordance with known principles of multi-tasking operations. Examples for such devices may include Apple's iPhone®, Apple's iPAD® as well as Google's Android™ based smart phones and tablet computers.

The mobile devices 120-1 to 120-N communicate wirelessly with the network 110 among others for the purpose of communication with the servers 130-1 through 130-$m$ (collectively servers 130). Such servers 130 may be e-mail servers, web servers, databases, and many other servers capable of receiving and/or providing data to and from the mobile devices 120. All the mobile devices 120-1 to 120-N can receive from and transmit to a cellular network. As mentioned above, such capabilities typically require purchase of a data plan from a network provider, such that the data plan's price is typically a function of the consumed data bandwidth, in either speed or volume, from the cellular network.

A mobile device, for example a mobile device 120-$i$ (where i=1 . . . N), can communicate with one or more servers 130 the same as the mobile device 120-$i$ may communicate for different purposes with different servers 130. For example and without limitations, a user may communicate using a web browser with a server, for example server 130-1, for the purpose of accessing an e-mail account with an e-mail server 130-$m$. In a multi-tasking environment of the mobile device 120-$i$ such communication may occur in parallel and in fact some of the access may be performed independent from any user action, for example periodic refreshing of a web page content or checking an e-mail server for upload of e-mail to the mobile device 120-$i$.

According to an embodiment disclosed herein, a LGA is an application installed and executed on one or more of the mobile devices 120-1 to 120-N. In one embodiment, the LGA is downloadable from an application marketplace, such as AppStore by Apple or Android Market. The LGA may be implemented as executable code (e.g., a script) and/or a firmware stored in a readable medium in a mobile device 120, hardware, or any combination thereof. In one embodiment, the LGA is executed over the mobile device 120. However, the LGA may be executed over any computing device including at least a processor and a non-transient computer readable medium.

The LGA identifies attempts to perform data communication over the network 110 with one or more of servers 130-1 to 130-m. As explained in more detail herein below, the LGA identifies which application attempts a data communication based on a transaction, without the need to interrogate or otherwise register the application attempting such data access. Once identified, the LGA, based on a predefined policy, can allow free data communication without going through the LGA or a controlled data communication regulated by the LGA. The controlled data communication may include, but is not limited to, data compression, encryption, authentication, routing, and more.

For example, if an e-mail application on the mobile device 120-i is set to periodically pull an e-mail message from an e-mail server, for example server 130-m, the LGA may respond to the requesting application with a 'no e-mail' indication and save an access to the network 110. The LGA may further aggregate communication over the data communication channel of the network 110 rather than by responding immediately to every request made by an application, thereby reducing data consumption.

In yet another embodiment, an external network component 140 is connected to the network 110. The external network component 140 communicates with the mobile device 120-i and may be instructed by the LGA, installed in the mobile device 120-i, to perform certain bandwidth consuming tasks. Such tasks include, for example, periodically refreshing a web page or retrieving a new e-mail that has arrived. The network component 140 is configured to perform such tasks, rather than having the mobile device 120-i perform them, thereby conserving both the device's 120-i data bandwidth and power.

To this end, the network component 140 communicates with the servers 130-1 to 130-m on behalf of the mobile device 120-i for these purposes and communicates with the mobile device 120-i as may be necessary. The network component 140 may be, but is not limited to, a proxy server, a local proxy server, a virtual private network (VPN) server, a traffic shaper, a router, a network address translator (NAT), and the like, that are operative between a client, i.e., a mobile device 120, and a server 130. The network component 140 is enabled to perform a variety of tasks as explained in more detail herein below, which cause the wireless communication between the mobile device 120-i to consume less bandwidth, thereby reducing the costs associated with the operation of the mobile device 120-i. It should be further noted that although a single network component 140 is shown herein, a plurality of network components may be used without departing from the scope of the invention.

Figure 2:
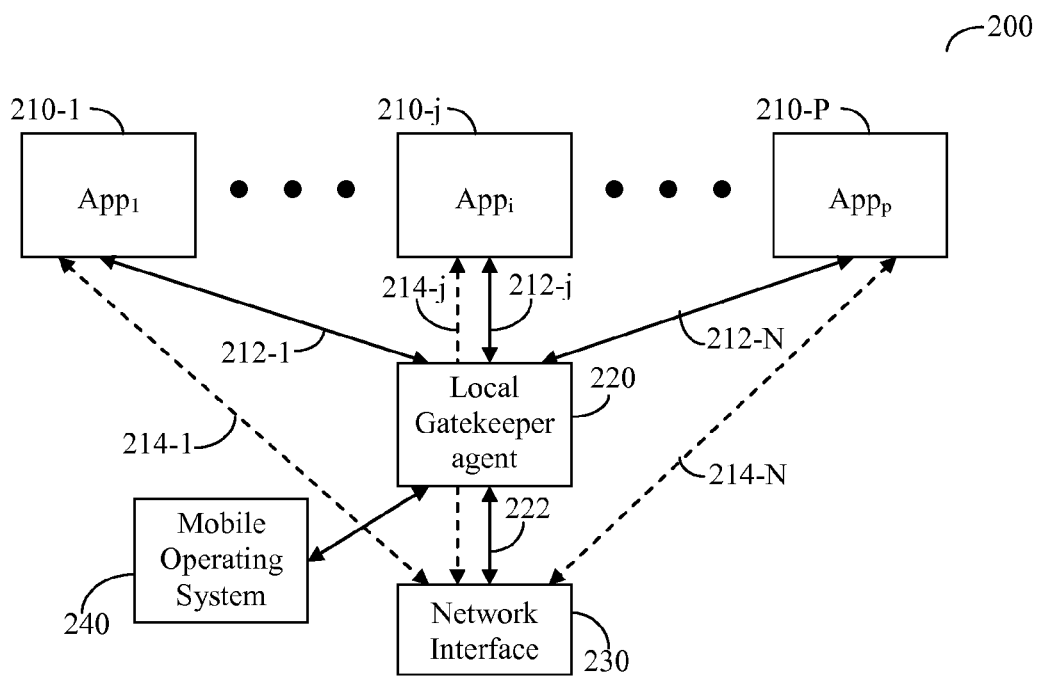
FIG. 2 is a schematic diagram of a communication scheme within a mobile device according to one embodiment.

FIG. 2 depicts an exemplary and non-limiting embodiment 200 of a communication scheme with a mobile device. A plurality of applications 210-j (j=1, 2, . . . P) execute in a multi-tasking mode. Each of the applications 210-1 to 210-P may at any given point in time request access to the network 110 (FIG. 1) for the purpose of data communication performed through the network interface 230. The LGA 220 is also installed on a mobile device 120-i (not shown in FIG. 2) and is further operative in the multi-tasking mode, hence the LGA 220 is active on the mobile device 120-i and is able to respond to such requests for access to the network interface 230. When an application 210, for example an application 210-j, attempts to access the network interface 230 over a communication link 214-j, the attempt is captured by the LGA 220 which determines if the application 210-j may communicate data freely with the network interface 230.

If that is the case, data communication continues to be performed over the link 214-j. However, if the LGA 220 determines that the application 210-j may not communicate freely with the network interface 230, the data communication is directed as such so that the application 210-j communicates over a communication link 212-j with the LGA 220, and the LGA 220 communicates on behalf of the application 210-j over communication link 222. When doing so, the LGA 220 may perform a plurality of operations with respect to the data communication request as discussed in more detail herein below. In an embodiment, over the link 212-j the LGA autonomously emulates communication of an application 210-j through the data network to reduce the bandwidth usage by the application. When such a connection is emulated, the application 210-j is unaware of the existence of the LGA 220.

It should be noted that while a single LGA 220 and a single network interface 230 have been shown in FIG. 2 and discussed herein, this should not be viewed as a limitation of the invention. In fact, a plurality of LGAs (220) may be used, but for the sake of simplicity are not illustrated herein. Similarly, and independently, a plurality of network interfaces (230) may be used, all without departing from the scope of the invention. It should be further noted that for the purpose of autonomous identification of an application communicating via the LGA 220, the LGA 220 interrogates the mobile operating system (OS) 240 of the mobile device 120-i to identify which application of the applications 210-1 through 210-P is performing a certain communication. Thereafter the LGA 220 communicates with the identified application, for example application 210-j, in the communication standard expected by that application. With this aim, the LGA 220 is configured to be operative with specific applications, for example, applications such as a web browser, and has the necessary components for communicating in the same way. Therefore, the LGA 220 may be updated periodically with communication information for the purpose of effectively communicating with applications installed on the mobile device 120-i.

Figure 3:
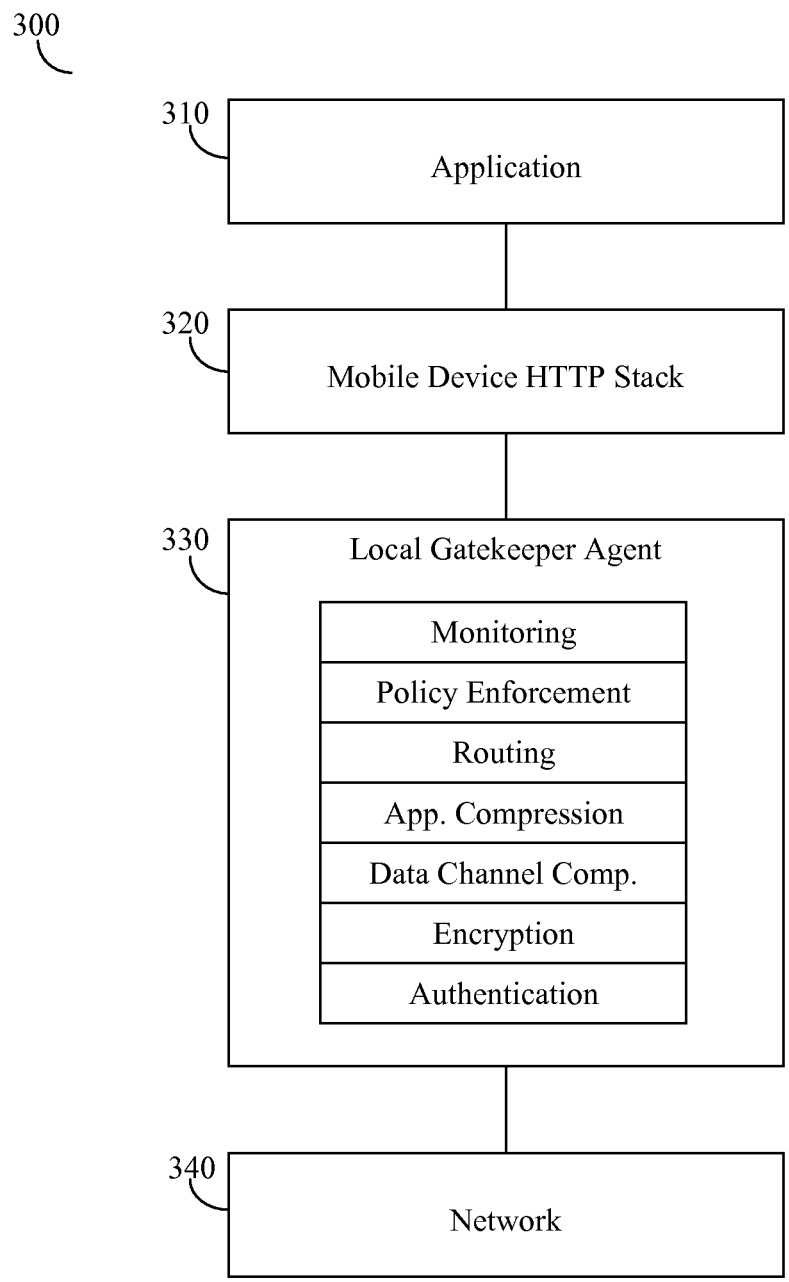
FIG. 3 is a schematic diagram of a communication stack according to one embodiment.

FIG. 3 is an exemplary and non-limiting schematic diagram of a communication stack 300 according to a disclosed embodiment. The application 310 typically communicates via the mobile device hypertext transport protocol (HTTP) stack 320. When a request for communication is performed, the LGA 330 captures the request and identifies the type of application; if action is necessary, the LGA 330 is configured to perform one or more of the bandwidth reduction functions of the LGA 330. These functions include, but are not limited to, monitoring, communication policy enforcement, routing, application compression, data compression, encryption and authentication. The LGA 330 communicates with the network 340 via a network interface, for example, a network interface 230.

The LGA 330, in one embodiment, includes at least two data communication channels, one channel being a direct channel through which data traffic flows directly between the application 310 and the network 340. The other channel is a regulated channel such that traffic is transferred between the application 310 and the network 340 only after such data communication attempts are processed by means of one or more of the bandwidth reduction functions employed by the LGA 330.

Figure 4:
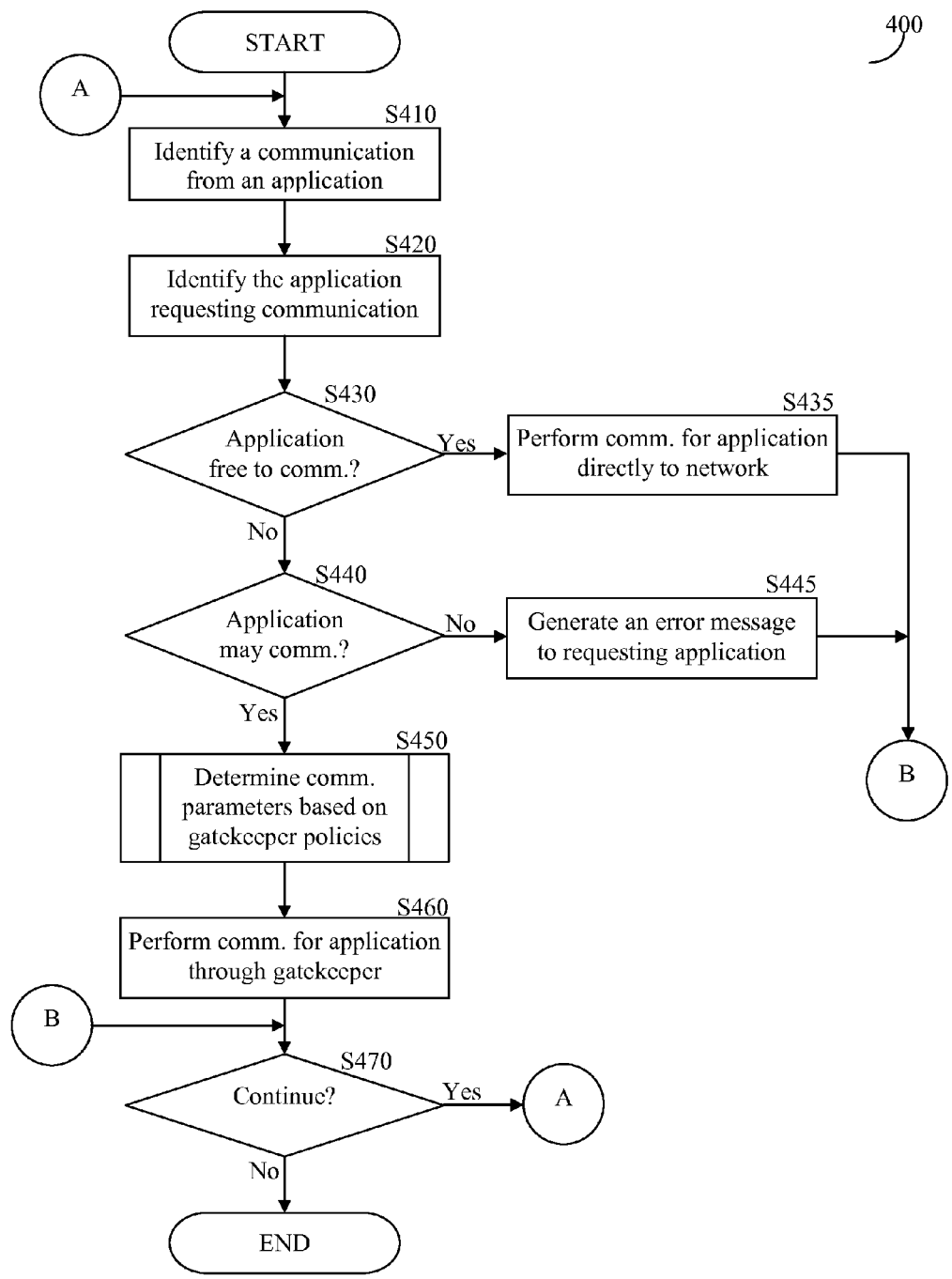
FIG. 4 is a flowchart of the operation of a local gatekeeper agent on a mobile device according to one embodiment.

FIG. 4 shows an exemplary and non-limiting flowchart 400 of the operation of a LGA on a mobile device according to one embodiment. FIG. 4 is described also with reference to the various elements shown in FIG. 2. In S410, the mobile device 120-*i* identifies a communication from an application, for example, application 210-*j*. In S420, the LGA 220 identifies the application requesting the communication, for example, by identifying an application identifier or name that appears in the HTTP header. In S430, it is checked whether the application 210-*j* may have free communication with the network interface 230, and if not execution continues with S440; otherwise, execution continues with S435 where uninterrupted communication between the application 210-*j* and the network interface 230 is enabled and execution then continues with S470.

In S440, it is checked whether the application 210-*j* may communicate a request for data, and if so execution continues with S450; otherwise, execution continues with S445 where a notification is generated and sent to the application 210-*j* reporting an error, after which execution continues with S470. The checks in S430 and S440 may be performed against a network access policy maintained, for example, in the LGA 220.

In an embodiment disclosed herein, the network access policy defines for each application, installed in the device 120-*i*, whether the application can freely access the data network, or can access the network with certain restrictions. Such restrictions may be for example, certain times, certain types of the data, or up to a certain bandwidth usage, a certain type of network (e.g., a WiFi or a cellular network), or if the applications cannot access the network at all. The network access policy may also define, for each "restricted access network," which bandwidth reduction function and/or communication policy to apply.

In one embodiment, the network access policy may also include an updated bandwidth usage value and the allowable data usage as defined in the data plan of the user. This can allow blocking data communication access through the cellular network when the user reaches his/her quota. The network access policy may be defined by the user and/or a vendor of the LGA 220.

In S450, based on the determination of the application 210-*j* type, for example an e-mail application, a web application, and so on, a specific communication policy appropriate for the specific communication pattern is enforced. The communication policy may be different from one application to another and may be determined based on the specific needs of the user. For example, and without limitations, in a case for requesting a check of an e-mail box on an e-mail server, the communication policy may allow this to happen every minute if connected over a free WiFi network, but only once an hour if the mobile device is connected over the cellular network. The communication policy may allow, while on a WiFi network, full upload and/or download of attached files, but not while connected over a cellular network where compression or removal schemes may be used. The communication policy applied allows the user to actively control at least the bandwidth consumption of the mobile device without needing to interact with or configure each application separately.

Furthermore, the LGA 220 may communicate with the network component 140 for the purpose of determining a desired policy enforcement for particular applications. For example, in the case of a web application requesting a video clip, the network component may provide a lower resolution video clip so as to reduce the required bandwidth. This can be done either by the network component 140 or by means of identifying another source for providing a desired resolution video clip. In S470, it is checked if it is necessary to continue the method, and if so execution continues with S410; otherwise, execution terminates.

According to an embodiment, each data item fetched by an application of a mobile device 120 that is stored in the cache of the mobile device 120 is also associated with a unique identifier. The unique identifier is generated locally on the mobile device or otherwise provided by a network component 140. The unique identifier may be a hash number generated by a predetermined hash function. The unique identifier is then used for those items in the cache that may have expired in time or that require re-fetching regardless of whether the content is in the mobile device 120 local cache. The request for the data is therefore sent from the mobile device to the network component 140 by the LGA 220 together with its associated unique identifier. The network component 140 then fetches the data item from one of the plurality of servers 130. Upon arrival of the data item to the network component 140, a unique identifier is generated respective of the fetched data item.

The generation of the unique identifier is identical in process to that of the generation of the unique identifier for the data item on the mobile device, for example by using the same hash function when the unique identifier is a hash number. The generated unique identifier is compared against the unique identifier received from the mobile device. If the generated unique identifier and the received unique identifier are equal then this means that the content in the cache of the mobile device 120 is valid and may be used. The network component then sends an appropriate indication to the mobile device 120 that the data item stored in its cache may be used. This saves on the use of communication bandwidth available to the mobile device 120, which saves a) costs of communications and, b) battery drain as less cellular data communication is required. One of ordinary skill in the art would readily appreciate that certain embodiments herein may be used to avoid any need of flushing caches to maintain coherency, or purging aging data due to unfounded suspicion of the data being stale data. It should be therefore understood that as a result of the operation of this mechanism the data item stored in the local cache (whether there from a past transaction or updated as a result of identification of a change) of the mobile device 120 is the same as the data item in the server 130 from which the original data item is fetched.

Figure 5:
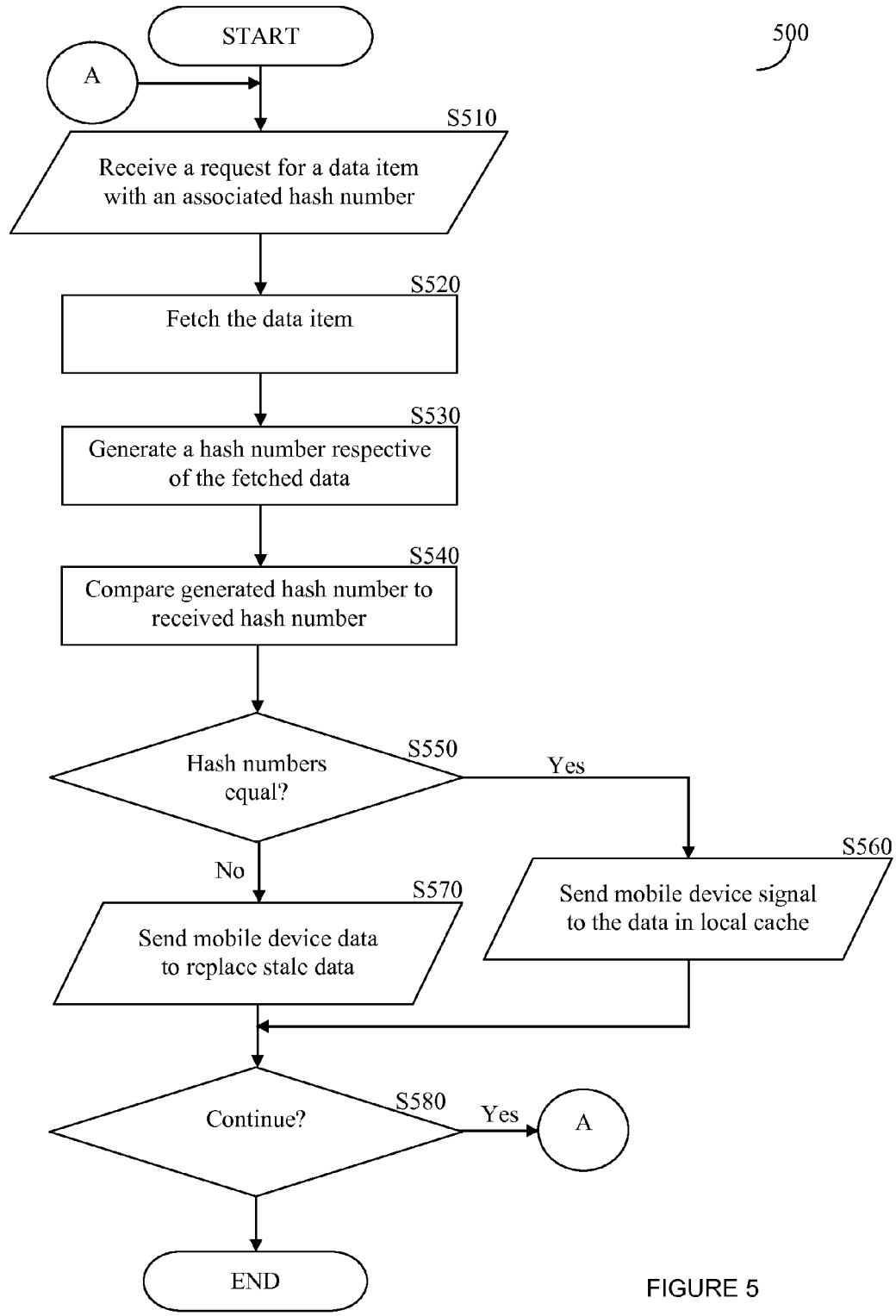
FIG. 5 is a flowchart of a method for the use of a cache memory of a mobile device according to an embodiment.

FIG. 5 shows an exemplary and non-limiting flowchart 500 of a method for the efficient use of a cache memory of a mobile device 120 according to one embodiment. In S510, the network component 140 receives a request from a mobile device 120, for example mobile device 120-1, for fetching a data item from a server 130, for example server 130-1. The request is accompanied by a hash number associated with the data item. In S520 the network component 140 fetches the requested data item from the server 130-1 through the network 110.

In S530 a hash number respective of the fetched data item is generated. An exemplary hash function may be a MD5 (message-digest algorithm) that produces a 128-bit (16-byte) hash value over the contents of the hash function. In S540 the generated hash number is compared to the hash number received from the mobile device together with the request for the data item. In S550 it is checked whether the generated hash number is equal to the received hash number and if so, execution continues with 560; otherwise, execution continues with S570. In S560, a signal or notification is sent to the mobile device 120-1 that the data item in its local cache is useable from the local cache, and execution continues with S580. In S570 a data item to replace the stale data item in the local cache of the mobile device 120-1 is sent to the mobile device 120-1.

In S580 it is checked whether to continue execution and if so, execution continues with S510; otherwise, execution terminates. While the flowchart is described with respect of a hash number, any unique identifier may be used instead without departing from the scope of the invention.

In one embodiment, a content fetched from a server 130 may be analyzed and determined to have two types of data, static data and dynamic data. In pages such as HyperText Markup Language (HTML) or JavaScript Object Notation (JSON) documents, the content may have certain parts that are static while others change periodically. By distinguishing between the two by means of textual analysis over time, certain portions are marked as static and receive a respective unique identifier, whereas other parts are determined to be dynamic and receive another respective unique identifier. When such a page is then requested, only the dynamic parts may be fetched after determining that the static portion has not changed.

The embodiments disclosed herein may be implemented as hardware, firmware, software, or any combination thereof. Moreover, the software is preferably implemented as an application program tangibly embodied on a program storage unit or tangible computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The memory may be a volatile memory, non-volatile memory or any combination thereof. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal. The display segments and mini-display segments may be shown on a display area that can be a browser or another other appropriate application, either generic or tailored for the purposes described in detail hereinabove.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method by a network component for cache management of a mobile device communicatively connected to the network component via a network, comprising:
   receiving by the network component a request from the mobile device for a data item residing in the cache, the request accompanied by a unique identifier associated with a static portion of the data item residing in the cache and a dynamic portion of the data item residing in the cache;
   fetching the data item from at least a server communicatively connected to the network component;
   determining a static portion and a dynamic portion of the data item residing in the cache; and
   generating a unique identifier respective of the dynamic portion or the fetched data item and a unique identifier respective of the static portion of the fetched data item; and
   comparing the generated unique identifier and the received unique identifier to determine whether a portion of the data item in the cache is the same as the respective portion of the data item fetched from the at least a server.

2. The method of claim 1, wherein a hash function generates both the unique identifier respective of the portion of the fetched data item and the unique identifier associated with the portion of the data item residing in the cache.

3. The method of claim 1, further comprises:
   sending the mobile device a signal indicating that the portion of the data item in the cache is the same as the portion of the data item fetched from the at least a server.

4. The method of claim 1, further comprises:
   sending the mobile device the portion of the fetched data item when the comparison indicates that the portion of the data item in the cache is not the same as the data item fetched from the at least a server.

5. The method of claim 1, wherein the network component is any one of:
   a proxy server, a virtual private network (VPN) server, a traffic shaper, a router, and a network address translator (NAT).

6. The method of claim 1, wherein the cache is resident on the mobile device,
   a hash function generates both the unique identifier respective of the portion of the fetched data item and the unique identifier associated with the portion of the data item residing in the cache,
   the hash function is resident on at least one of the mobile device and the network component, and
   the mobile device is any computing device coupled to the network.

7. The method of claim 1, wherein determining the static portion and the dynamic portion of the data item residing in the cache comprises performing a textual analysis of the data item to determine which parts of the data item are dynamic or static over time.

8. A non-transient computer readable medium containing instructions that when executed on a computer perform the method of claim 1.

9. A network component for cache management of a mobile device communicatively coupled to the network component via a network, comprising:
   an interface device having an interface to a data communication network, the interface configured for receiving a request for a data item residing in the cache from at least one application executed on the mobile device, the data item with a unique identifier associated with a static portion thereof and a unique identifier associated with a dynamic portion thereof, and fetching at least a portion of the data item from at least a server communicatively coupled to the network component; and a processor providing a processing unit that generates a unique identifier respective of the static portion of the fetched data item and a unique identifier respective of the dynamic portion of the fetched data item and that compares the generated unique identifiers and the received unique identifiers to determine whether the static portion or the dynamic portion of the data item in the cache is the same as the static portion or the dynamic portion of the data item fetched from the at least a server.

10. The network component of claim 9, wherein a hash function generates both the unique identifier respective of the portion of the fetched data item and the unique identifier associated with the portion of the data item residing in the cache.

11. The network component of claim 9, wherein under the control of the processing unit the network component sends the mobile device a signal indicating that the portion of the data item in cache is the same as the portion of the data item fetched from the at least a server.

12. The network component of claim 9, wherein under the control of the processing unit the network component sends the mobile device the portion of the fetched data item when the comparison indicates that the portion of the data item in the cache is not the same as the portion of the data item fetched from the at least a server.

13. The network component of claim 9, wherein the network component is any one of: a proxy server, a virtual private network (VPN) server, a traffic shaper, a router, and a network address translator (NAT).

14. The network component of claim 9, wherein the cache is resident on the mobile device, a hash function generates both the unique identifier respective of the portion of the fetched data item and the unique identifier associated with the portion of the data item residing in the cache, the hash function is resident on at least one of the mobile devices and the network component, and the mobile device is any computing device coupled to the network.

15. A mobile device comprising:

a processing unit;

a data communication interface to enable communication with at least a network component;

a local cache; and a memory containing a plurality of instructions associated with an application for accessing at least a portion of a data item via the network component and storing the received portion of the data item in the local cache, the processing unit is configured to send a unique identifier associated with a static portion of the data item stored in the local cache and a dynamic portion of the data item stored in the local cache to the network component upon a subsequent request of the application to access the data item, and to receive an indication from the network component of whether the portion of the data item in the local cache is the same as a portion of a data item in at least a server communicatively coupled to the mobile device.

16. The mobile device of claim 15, wherein the unique identifier is a hash number generated responsive to a hash function of the portion of the data item.

17. The mobile device of claim 15, wherein the mobile device receives a signal from the network component indicating that the portion of the data item in local cache is the same as the portion of the data item requested by the application and may be used by the application executing on the mobile device.

18. The mobile device of claim 15, wherein the mobile device receives from the network device the portion of the fetched data item to replace the portion of the data item in local cache.

* * * * *